(12) United States Patent
Konishi et al.

(10) Patent No.: US 9,745,204 B2
(45) Date of Patent: Aug. 29, 2017

(54) METHOD OF PRODUCING BARIUM TITANATE

(71) Applicant: Murata Manufacturing Co., Ltd., Nagaokakyo-shi, Kyoto-fu (JP)

(72) Inventors: Shinya Konishi, Nagaokakyo (JP); Kazuya Fujii, Nagaokakyo (JP); Junichi Saito, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 14/929,592

(22) Filed: Nov. 2, 2015

(65) Prior Publication Data
US 2016/0052794 A1 Feb. 25, 2016

Related U.S. Application Data

(63) Continuation of application No. PCT/JP2014/059394, filed on Mar. 31, 2014.

(30) Foreign Application Priority Data

May 10, 2013 (JP) ................................. 2013-099947

(51) Int. Cl.
*C01G 23/00* (2006.01)
*C04B 35/468* (2006.01)

(52) U.S. Cl.
CPC ........ *C01G 23/006* (2013.01); *C04B 35/4682* (2013.01); *C04B 2235/5409* (2013.01); *C04B 2235/761* (2013.01); *C04B 2235/762* (2013.01); *C04B 2235/765* (2013.01); *Y02P 20/544* (2015.11)

(58) Field of Classification Search
CPC .............. C01G 23/006; C04B 35/4682; C04B 2235/5409; C04B 2235/761; C04B 2235/762; C04B 2235/765; Y02P 20/544
See application file for complete search history.

(56) References Cited

FOREIGN PATENT DOCUMENTS

JP  2009-026820 A  2/2009
JP  2012-062229 A  3/2012

OTHER PUBLICATIONS

Atsushi Nakahira et al., "Effect of Supercritical Drying Method on Microstructure and Properties of Al2O3 Composites Reinforced with Ultrafine SiC Particulate"; Journal of the Ceramic Society of Japan, 1999, vol. 107, No. 1245, pp. 460-464.
International Search Report issued for PCT/JP2014/059394, date of mailing Jul. 1, 2014.
Written Opinion of the International Searching Authority issued for PCT/JP2014/059394, date of mailing Jul. 1, 2014.
(Continued)

*Primary Examiner* — Melvin C Mayes
*Assistant Examiner* — Michael Forrest
(74) *Attorney, Agent, or Firm* — Arent Fox LLP

(57) ABSTRACT

A method of producing barium titanate that includes making a slurry by dispersing barium titanate powder in a solvent such as ethanol. Then, in a high-pressure vessel, substituting supercritical fluid including carbon dioxide gas, for example, for the solvent in the slurry. Then, separating the barium titanate powder from the supercritical fluid by gasifying the supercritical fluid. Then, performing a heat treatment on the separated barium titanate powders to produce the barium titanate.

12 Claims, 2 Drawing Sheets

(56) References Cited

OTHER PUBLICATIONS

Zoran Novak et al.; "Preparation BaTiO3 powders using supercritical CO2 drying of gels"; Journal of Non-Crystalline Solids, vol. 285, 2001, pp. 44-49.

J.F. Bocquet et al.; "Barium titanate powders synthesis from solvothermal reaction and supercritical treatment"; Materials Chemistry and Physics 57 (1999) pp. 273-280.

Botao Ji et al.; "Preparation and electrical properties of nanoporous BaTiO3"; Materials Letters 64 (2010), pp. 1836-1838.

Zoran Novak et al.: "Synthesis of barium tifanate using supercritical CO2 drying of gels": Journal of Supercritical Fluids 19 (2001), pp. 209-215.

METHOD OF PRODUCING BARIUM TITANATE

CROSS REFERENCE TO RELATED APPLICATIONS

The present application is a continuation of International application No. PCT/JP2014/059394, filed Mar. 31, 2014, which claims priority to Japanese Patent Application No. 2013-099947, filed May 10, 2013, the entire contents of each of which are incorporated herein by reference.

FIELD OF THE INVENTION

The present invention relates to methods of producing barium titanate, and more particularly to a method of producing barium titanate used for a dielectric of a laminated ceramic capacitor, for example.

BACKGROUND OF THE INVENTION

Japanese Patent Laying-Open No. 2009-26820 (PTD 1) discloses "A method of producing composite ceramic material powders for a laminated ceramic capacitor, wherein powders of mother particles of a metal oxide and powders of child particles of a metal or a metal oxide are mixed together, dispersed in supercritical fluid, and then dried, to cause uniform adhesion of the child particles to surfaces of the mother particles in a dispersed state without aggregation between the child particles, thereby making a composite of the mother particles and the child particles" in claim 1.

PTD 1 states in paragraph 0022 that "That is, composite ceramic material powders can be produced, with child particles being dispersed without adhering to and aggregating with each other in a supercritical fluid environment, and the child particles uniformly adhering to surfaces of mother particles without aggregating with each other because of low surface tension" by providing such an arrangement.

Japanese Patent Laying-Open No. 2012-62229 (PTD 2) discloses "A method of producing a perovskite-type composite oxide represented by the general formula of $ABO_3$, comprising a slurry preparation step of preparing titanium oxide slurry containing titanium oxide powders dispersed in water, the integral width of the diffraction peak of the (101) plane of the powders measured via X-ray diffraction being not more than 2.0°, and a reaction step of adding a hydroxide of an alkaline-earth element to the titanium oxide slurry to cause reaction between them, thereby producing a perovskite-type composite oxide" in claim 1, and discloses "The method of producing a perovskite-type composite oxide according to any one of claims 1 to 5, further comprising a step of performing heat treatment on the perovskite-type composite oxide produced in the reaction step" in claim 6.

PTD 2 states in paragraph 0029 that "a perovskite-type composite oxide having a large specific surface area, a high c/a axis ratio and high crystallinity can be provided" by providing such an arrangement.

PTD 1: Japanese Patent Laying-Open No. 2009-26820
PTD 2: Japanese Patent Laying-Open No. 2012-62229

SUMMARY OF THE INVENTION

There is an increasing trend to reduce an element thickness of a laminated ceramic capacitor. In order to realize a reduced thickness of not more than 0.8 µm, for example, it is required that unsintered raw material powders which will become a ceramic sintered body layer as a dielectric layer, for example, powders of a barium titanate-based material, have a fine particle size of, for example, not more than 150 nm.

Methods of preparation for providing powders of a barium titanate-based material include a solid phase method of using barium carbonate powders and titanium oxide powders for preparation, and a liquid phase method such as a hydrothermal synthesis method and an oxalic acid method. If fine barium titanate powders of not more than 150 nm are synthesized with these methods of preparation, however, the tetragonality tends to be reduced due to surface defects of powder particles, that is, a ratio of the c axis to the a axis (c/a axis ratio) of a barium titanate crystal tends to be reduced. It is known that the use of barium titanate powders having low tetragonality for a dielectric layer of a laminated ceramic capacitor will cause problems such as a reduction in relative dielectric constant, and large grain growth during sintering.

In PTD 1 where the child particles uniformly adhere to the surfaces of the mother particles in a dispersed state, it is stated that the mother particles (barium titanate powders) have a particle size of, for example, 200 nm (see paragraph 0012 of PTD 1).

In view of the problems described above, barium titanate powders having high tetragonality despite having a small particle size are desired. From this viewpoint, the barium titanate powders of PTD 1 may not be sufficient.

Moreover, although PTD 2 states that "a perovskite-type composite oxide having a large specific surface area, a high c/a axis ratio and high crystallinity can be provided," barium titanate powders having fine particles and higher crystallinity are desired in order to reduce an element thickness.

Thus, a main object of the present invention is to provide a method of producing barium titanate having high tetragonality despite having a fine particle size of from 80 to 150 nm, so that an element thickness of a laminated ceramic capacitor and the like can be reduced.

A method of producing barium titanate according to the present invention includes the steps of making a slurry by dispersing barium titanate powder in a solvent, substituting supercritical fluid for the solvent in the slurry, separating the barium titanate powder from the supercritical fluid by gasifying the supercritical fluid, and performing a heat treatment on the separated barium titanate powder.

Preferably, in the method of producing barium titanate according to the present invention, the solvent includes at least one of ethanol, isopropyl alcohol, and methyl ethyl ketone.

Preferably, in the method of producing barium titanate according to the present invention, the supercritical fluid includes carbon dioxide gas.

Preferably, in the method of producing barium titanate according to the present invention, the barium titanate powder is obtained by adding a hydroxide of an alkaline-earth metal element to a titanium oxide slurry containing titanium oxide powder dispersed in water to cause reaction between them.

It was discovered that there is a correlation between the surface tension of a solvent in a drying process of the barium titanate powder dispersed in the solvent, and the aggregability of the barium titanate powder and the crystallinity thereof after heat treatment.

That is, during an evaporation process of the solvent, drying of the barium titanate powder takes place from a liquid phase to a gas phase. In this process, a force of attracting particles of the barium titanate powder together acts due to a liquid bridging force. This is a main cause for dry aggregation of the barium titanate powder. As this liquid bridging force has a proportional relationship with the surface tension of the solvent, the liquid bridging force is not generated unless there is surface tension.

Based on the discovered result that there is a correlation between the surface tension of a solvent, and the aggregability of barium titanate powder and the crystallinity thereof after heat treatment, the method of producing barium titanate according to the present invention substitutes supercritical fluid for a solvent in the slurry containing the barium titanate powder, and employs supercritical drying of separating the barium titanate powder from the substituting supercritical fluid by gasifying the supercritical fluid, as a method of producing barium titanate powder of the highest quality (low aggregability, high crystallinity).

Moreover, the present invention performs heat treatment (calcination treatment) on the dried barium titanate powder to cause grain growth, thereby producing barium titanate powder having high tetragonality.

In the present invention, a supercritical process that allows drying without the action of surface tension of a solvent is applied to dry the slurry, thereby allowing production of barium titanate powder having low aggregability and high crystallinity.

That is, in the present invention, since a liquid bridging force is not generated between the particles by conducting the drying in the supercritical process, dry powders of barium titanate having low aggregability can be provided. Moreover, in the present invention, by performing the heat treatment (calcination treatment) on such dry powders of barium titanate having low aggregability, a barium titanate powder having high tetragonality and a fine particle size (specific surface area-equivalent diameter) of from 80 to 150 nm can be provided.

In the method of producing barium titanate according to the present invention, therefore, barium titanate powder having low aggregability and high crystallinity can be produced.

In the method of producing barium titanate according to the present invention, if the solvent includes at least one of ethanol, isopropyl alcohol, and methyl ethyl ketone, the solvent and the supercritical fluid are highly compatible with each other, thus facilitating the substitution of the supercritical fluid for the solvent.

In the method of producing barium titanate according to the present invention, if the supercritical fluid includes carbon dioxide gas, a supercritical state can be readily provided as the supercritical fluid has a supercritical temperature of 31.1° C. and a supercritical pressure of 7.4 MPa, and furthermore, the supercritical fluid can be readily handled as the carbon dioxide gas is non-combustible.

Moreover, in the method of producing barium titanate according to the present invention, if the barium titanate powder is obtained by adding a hydroxide of an alkaline-earth metal element to a titanium oxide slurry containing titanium oxide powder dispersed in water to cause reaction between them, a barium titanate powder having finer particles and higher tetragonality can be provided.

According to the present invention, barium titanate powders having high tetragonality despite having a fine particle size of from 80 to 150 nm can be produced, so that an element thickness of a laminated ceramic capacitor and the like can be reduced.

The foregoing and other objects, features and advantages of the present invention will become more apparent from the following description of embodiments for carrying out the invention in conjunction with the accompanying drawings.

DETAILED DESCRIPTION OF THE PREFERRED EMBODIMENTS

First, a barium titanate powder was prepared.

The barium titanate powder is not particularly limited, and may be made with a common solid phase method, hydrothermal synthesis, oxalic acid method or the like. Here, barium titanate powder synthesized with the method described in PTD 2 was used.

That is, $TiO_2$ powder having a specific surface area of 300 $m^2/g$ was prepared and mixed with pure water, to produce a $TiO_2$ slurry. The produced $TiO_2$ slurry was heated and raised in temperature to 70° C., then $Ba(OH)_2$ powder was added thereto so that a Ba/Ti ratio is 1:1 while the slurry was stirred. After the addition of the $Ba(OH)_2$ powder, the slurry was held at a temperature of not less than 80° C. for one hour while being stirred, to cause reaction between $TiO_2$ and $Ba(OH)_2$. The obtained slurry was put in an oven and evaporatively dried, to provide $BaTiO_3$ powder (barium titanate powder).

A specific surface area of the barium titanate powder thus obtained was measured with the BET method (Macsorb® from Mountech Co., Ltd. was used as a measuring machine) and found to be 65 $m^2/g$ (specific surface area-equivalent diameter 15 nm). In addition, X-ray diffraction (using CuKα as a source) was carried out and a Rietveld analysis was performed on the obtained results, to determine a ratio between the c-axis length and the a-axis length of a crystal lattice (c/a axis ratio). The result was that the crystal lattice had a c/a axis ratio of 1.0000 and a cubic structure.

Next, the barium titanate powder was dispersed at a concentration of 5 vol % in ethanol as a solvent by using a ball mill, to produce a slurry.

Figure 1:
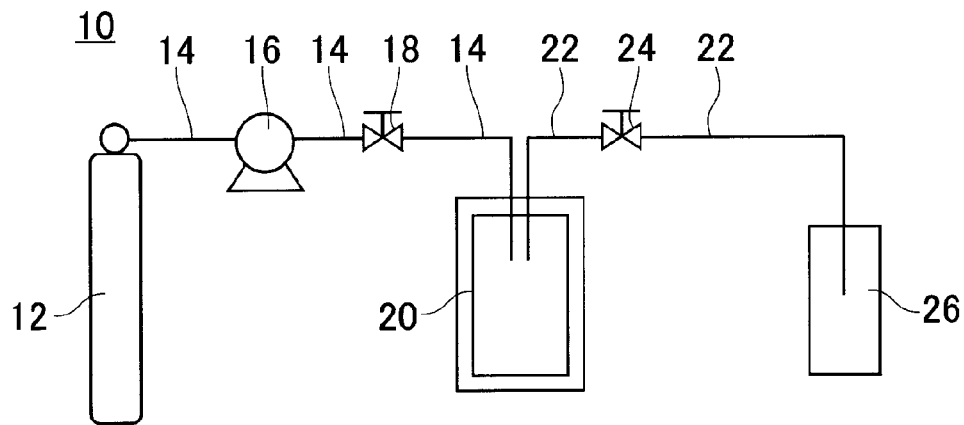
FIG. 1 is a diagram showing an example of a production device used for implementing a method of producing barium titanate according to the present invention.

Described now is a production device 10 shown in FIG. 1 used for implementing a method of producing barium titanate from this slurry.

Production device 10 shown in FIG. 1 includes a bottle 12. Bottle 12 is filled with liquid carbon dioxide, for example, which may constitute supercritical fluid.

Bottle 12 is connected to an inlet of a pump 16 via a feed pipe 14. An outlet of pump 16 is connected to a high-pressure vessel 20 via a pressure valve 18 and the like. That is, the outlet of pump 16 and an inlet of pressure valve 18 are also connected together by feed pipe 14, and an outlet of pressure valve 18 and high-pressure vessel 20 are also connected together by feed pipe 14.

Feed pipe 14 and pump 16 are for supplying the carbon dioxide in bottle 12 to high-pressure vessel 20. Pressure valve 18 is for opening/closing the path between pump 16 and high-pressure vessel 20.

High-pressure vessel 20 is for supercritical drying of the barium titanate powder in the slurry described above, for example, and has a heater (not shown) for heating high-pressure vessel 20 wound therearound.

In addition, high-pressure vessel 20 is connected to a collection unit 26 via a discharge pipe 22 and an automatic pressure regulation valve 24. That is, high-pressure vessel 20 and an inlet of automatic pressure regulation valve 24 are connected together by discharge pipe 22, and an outlet of automatic pressure regulation valve 24 and collection unit 26 are also connected together by discharge pipe 22.

Discharge pipe 22 is for discharging collected materials such as ethanol and carbon dioxide gas from high-pressure vessel 20 to collection unit 26. Automatic pressure regulation valve 24 is for regulating a pressure in high-pressure vessel 20 by automatically opening/closing the path between high-pressure vessel 20 and collection unit 26. Collection unit 26 is for collecting the collected materials such as ethanol and carbon dioxide gas from high-pressure vessel 20.

The slurry described above was put in high-pressure vessel 20 of production device 10 shown in FIG. 1, high-pressure vessel 20 was heated by the heater to 90° C., for example, and carbon dioxide gas was pressurized and supplied from bottle 12 to high-pressure vessel 20 via feed pipe 14. The pressure in high-pressure vessel 20 was regulated to 15 MPa, for example, to gradually substitute the supercritical fluid including carbon dioxide gas for the ethanol in the slurry within high-pressure vessel 20. It is noted that the supercritical fluid has the diffusion property of gas and the dissolution property of liquid, and therefore has the power of dissolving the solvent, that is, the power of separating the powder (barium titanate powder) and the liquid (solvent) from each other.

Then, automatic pressure regulation valve 24 was adjusted to discharge the ethanol in high-pressure vessel 20 together with the carbon dioxide gas which was obtained by gasifying the supercritical fluid so as to separate the barium titanate powder from the supercritical fluid, and the discharged materials were collected by collection unit 26.

It is noted that the supply of the carbon dioxide gas to high-pressure vessel 20, the substitution of the supercritical fluid including carbon dioxide gas for the ethanol in the slurry within high-pressure vessel 20, and the collection of the ethanol and the carbon dioxide gas as described above are preferably performed a certain number of times, for example, a plurality of times, so as not to leave the solvent in high-pressure vessel 20.

Upon completion of the collection of the ethanol and the carbon dioxide gas, the pressure in high-pressure vessel 20 was lowered to atmospheric pressure, and the heater was turned off to lower the temperature in high-pressure vessel 20, and then the separated dry powder of barium titanate in high-pressure vessel 20 (sample number 1) was removed.

In addition, a slurry which was similar to the slurry described above and had been separately subjected to dispersion treatment was discharged to a tray, which was then put in an oven whose temperature was set to 80° C. to evaporate ethanol in the slurry, thus producing a dry powder of barium titanate (sample number 2). It is noted that the powder of sample number 2 is beyond the scope of the present invention.

Figure 2:
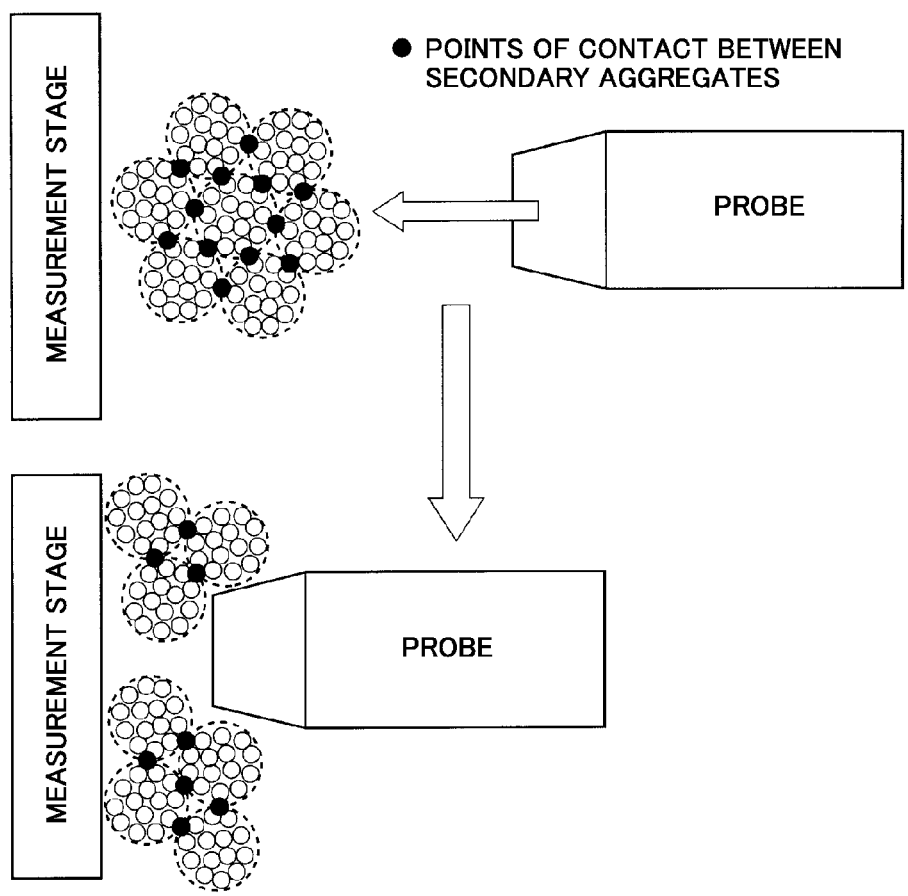
FIG. 2 is a diagram showing an image of measurement of crushing strength of barium titanate powders.

Regarding each of the dry powders of barium titanate produced as above (sample numbers 1 and 2), the crushing strength of the dry powders, that is, the strength when the powder particles are crushed as shown in FIG. 2, was measured using a fine particle crushing strength measurement device of NS-A100 type from Nano Seeds Corporation. In this case, the powder particles were pressed against a measurement stage by a probe as shown in the upper portion of FIG. 2, and the strength when the powder particles were crushed at points of contact between secondary aggregates was measured as shown in the lower portion of FIG. 2. The measurement results of those crushing strengths are shown in Table 1.

TABLE 1

| Sample Number | Drying Method | Crushing Strength (kPa) |
|---|---|---|
| 1 | Supercritical Drying | 4 |
| 2 | Oven Drying | 640 |

Moreover, a predetermined amount of each of the two types of dry powders produced as above (sample numbers 1 and 2) was put in a sagger made of $ZrO_2$, and calcined at a temperature of from 800 to 1000° C. for two hours in a sintering furnace as heat treatment.

A specific surface area ($m^2/g$) and the crystallinity (c/a axis ratio) of each of the obtained calcined powders of barium titanate were measured in a similar manner to above. The relation between the specific surface area ($m^2/g$) and the crystallinity (c/a axis ratio) of those powders is shown in a graph of FIG. 3.

In the crushing strength measurement described above, a load is applied to the powders by the small probe, and the strength when the powders are crushed (crushing strength) is measured. That is, the aggregability of the powders can be evaluated. It can be seen that the powder dried by supercritical drying (sample number 1) has low crushing strength as compared to the powder dried by oven drying (sample number 2). That is, it is considered that the aggregation is suppressed in the powder subjected to supercritical drying as compared to the powder subjected to oven drying.

Figure 3:
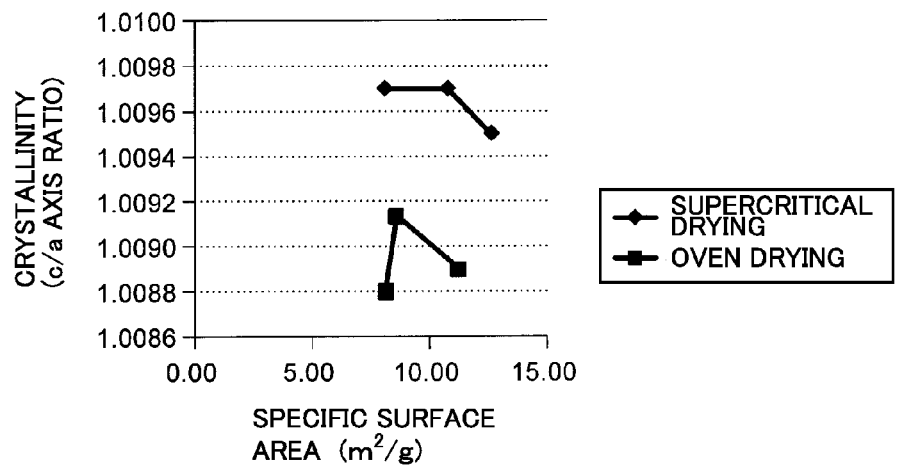
FIG. 3 is a graph indicative of relation between a specific surface area and crystallinity (c/a axis ratio) of barium titanate powders subjected to supercritical drying and barium titanate powders subjected to oven drying.

When heat treatment (calcination treatment) is performed on such dry powders, the powder subjected to supercritical drying can provide barium titanate powder having high tetragonality as compared to the powder subjected to oven drying having the same specific surface area. That is, when the powders having a specific surface area of about 10 $m^2/g$ (specific surface area-equivalent diameter 100 nm) are compared to each other as shown in FIG. 3, sample number 1 (the powder subjected to supercritical drying) has a c/a axis ratio of about 1.0097 while the ratio of sample number 2 (the powder subjected to oven drying) is about 1.0090, and thus the powder of sample number 1 can provide a barium titanate powder having higher tetragonality than the powder of sample number 2.

In the supercritical drying described above, the solvent is brought into contact with the supercritical carbon dioxide gas and dissolved, and when a predetermined solubility is reached, the solvent is discharged along with the supercritical carbon dioxide gas to the outside of high-pressure vessel 20. This operation is repeated to discharge the entire solvent in high-pressure vessel 20 to the outside of high-pressure vessel 20, thus substituting the supercritical carbon dioxide gas for the solvent. As a result of this process, there is no solvent remaining in high-pressure vessel 20, that is, a liquid phase-gas phase interface is not formed. Thus the powder can be dried without the action of surface tension of the solvent. As the dispersibility of the powder can be maintained by this drying, powder having low aggregability can be designed to provide powder having high tetragonality after calcination.

Figure 4:
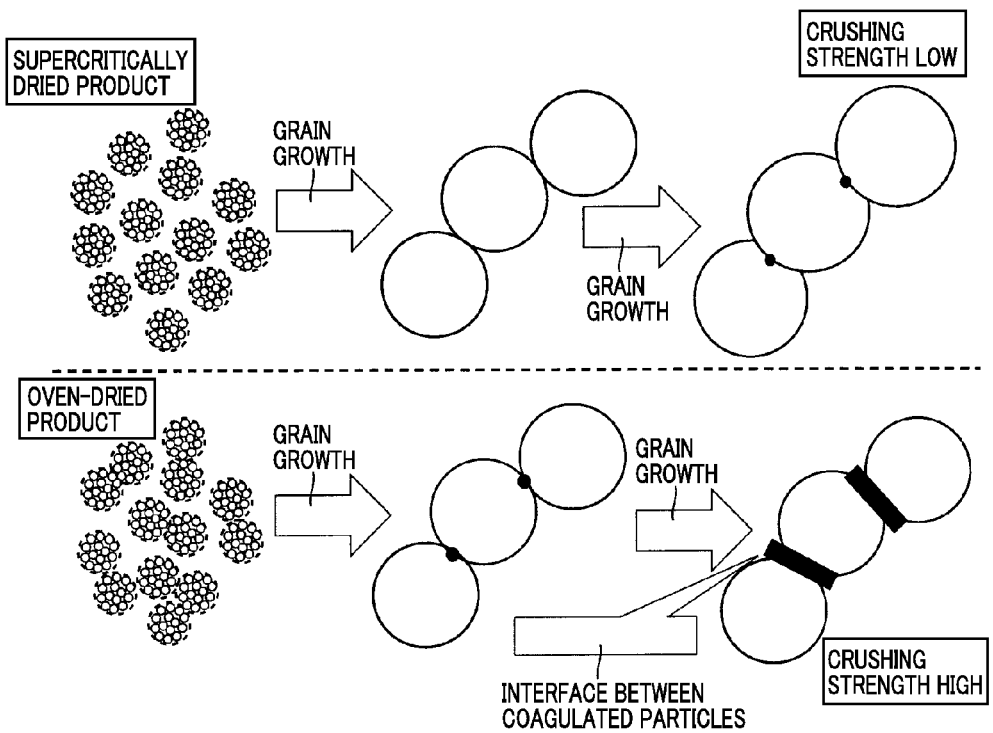
FIG. 4 is a diagram showing an image of grain growth by heat treatment (calcination treatment) on barium titanate powders subjected to supercritical drying (supercritical product) and barium titanate powders subjected to oven drying (oven-dried product), with the upper portion showing the image of the supercritical product and the lower portion showing the image of the oven-dried product.

The reason for this is believed to be that the surface tension does not occur and thus the distance between particles does not vary during the supercritical drying, thus allowing production of powder having high crystallinity. An image of this state is shown in the upper portion of FIG. 4. It is considered that, since the barium titanate powder subjected to supercritical drying has a small particle size and a high c/a axis ratio, the use of this powder for a laminated ceramic capacitor can lead to a high dielectric constant $\epsilon r$, and improved reliability because of controlled grain growth.

In the oven drying, on the other hand, it is considered that the dried powder have high aggregability due to the effect of surface tension of the solvent, and the frequency of coagulated particles increases (the number of points of contact between the particles increases) due to sintering, resulting in the generation of stress at the points of contact to lower the crystallinity (c/a axis ratio). An image of this state is shown in the lower portion of FIG. 4.

In this manner, the oven drying may cause the generation of coarse particles after calcination due to aggregation. In this case, the application to a thin laminated ceramic capacitor may result in a faulty short circuit due to the coarse particles, thus lowering a production process yield.

In contrast, the method of producing barium titanate according to the present invention described above employing the supercritical drying can produce barium titanate powder having low aggregability and high crystallinity, that is, a barium titanate powder having high tetragonality despite having a fine particle size of from 80 to 150 nm. Thus, the produced barium titanate powder is sufficient to reduce an element thickness of a dielectric of a laminated ceramic capacitor.

In the method of producing barium titanate according to the present invention described above, since the solvent in the slurry containing the barium titanate powder dispersed therein includes ethanol, the solvent and the supercritical fluid are highly compatible with each other, thus facilitating the substitution of the supercritical fluid for the solvent. If the solvent includes at least one of ethanol, isopropyl alcohol, and methyl ethyl ketone, the solvent and the supercritical fluid are highly compatible with each other, thus facilitating the substitution of the supercritical fluid for the solvent.

Further, in the method of producing barium titanate according to the present invention described above, since the supercritical fluid includes carbon dioxide gas, a supercritical state can be readily provided as the supercritical fluid has a supercritical temperature of 31.1° C. and a supercritical pressure of 7.4 MPa, and furthermore, the supercritical fluid can be readily handled as the carbon dioxide gas is non-combustible.

Moreover, in the method of producing barium titanate according to the present invention described above, since the barium titanate powder is obtained by adding a hydroxide of an alkaline-earth metal element to a titanium oxide slurry containing titanium oxide powder dispersed in water to cause reaction between them, barium titanate powder having finer particles and higher tetragonality can be provided.

The barium titanate produced with the production method according to the present invention is not limited to $BaTiO_3$, but may have Ca or Sr substituting for part of Ba in $BaTiO_3$.

The barium titanate produced with the method according to the present invention is particularly suitable for use as a dielectric material for a laminated ceramic capacitor, for example.

REFERENCE SIGNS LIST 10 production device; 12 bottle; 14 feed pipe; 16 pump; 18 pressure valve; 20 high-pressure vessel; 22 discharge pipe; 24 automatic pressure regulation valve; 26 collection unit.

The invention claimed is:

1. A method of producing barium titanate, the method comprising:
   making a slurry by dispersing a barium titanate powder in a solvent;
   substituting a supercritical fluid for said solvent in said slurry;
   separating said barium titanate powder from said supercritical fluid by gasifying said supercritical fluid to produce a separated barium titanate powder; and
   performing a heat treatment on said separated barium titanate powder.

2. The method of producing barium titanate according to claim 1, wherein said solvent includes at least one of ethanol, isopropyl alcohol, and methyl ethyl ketone.

3. The method of producing barium titanate according to claim 2, wherein said supercritical fluid includes carbon dioxide gas.

4. The method of producing barium titanate according to claim 1, wherein said supercritical fluid includes carbon dioxide gas.

5. The method of producing barium titanate according to claim 4, wherein said barium titanate powder is obtained by adding a hydroxide of an alkaline-earth metal element to a titanium oxide slurry containing a titanium oxide powder dispersed in water to cause reaction between said hydroxide and titanium oxide powder.

6. The method of producing barium titanate according to claim 3, wherein said barium titanate powder is obtained by adding a hydroxide of an alkaline-earth metal element to a titanium oxide slurry containing a titanium oxide powder dispersed in water to cause reaction between said hydroxide and titanium oxide powder.

7. The method of producing barium titanate according to claim 2, wherein said barium titanate powder is obtained by adding a hydroxide of an alkaline-earth metal element to a titanium oxide slurry containing a titanium oxide powder dispersed in water to cause reaction between said hydroxide and titanium oxide powder.

8. The method of producing barium titanate according to claim 1, wherein said barium titanate powder is obtained by adding a hydroxide of an alkaline-earth metal element to a titanium oxide slurry containing a titanium oxide powder dispersed in water to cause reaction between said hydroxide and titanium oxide powder.

9. The method of producing barium titanate according to claim 1, further comprising heating said slurry.

10. The method of producing barium titanate according to claim 9, further comprising pressurizing said slurry.

11. The method of producing barium titanate according to claim 1, further comprising pressurizing said slurry.

12. The method of producing barium titanate according to claim 1, wherein the barium titanate has a particle size from 80 to 150 nm.

\* \* \* \* \*